(12) United States Patent
Jennings

(10) Patent No.: US 11,586,436 B1
(45) Date of Patent: Feb. 21, 2023

(54) SYSTEMS AND METHODS FOR VERSION CONTROL IN A COMPUTING DEVICE

(71) Applicant: SOOS LLC, Winooski, VT (US)

(72) Inventor: Joshua Jennings, South Royalton, VT (US)

(73) Assignee: SOOS LLC, Winooski, VT (US)

(*) Notice: Subject to any disclaimer, the term of this patent is extended or adjusted under 35 U.S.C. 154(b) by 0 days.

(21) Appl. No.: 17/879,001

(22) Filed: Aug. 2, 2022

(51) Int. Cl.
 *G06F 8/71* (2018.01)
 *G06N 20/00* (2019.01)
 *G06F 8/61* (2018.01)

(52) U.S. Cl.
 CPC .............. *G06F 8/71* (2013.01); *G06F 8/61* (2013.01); *G06N 20/00* (2019.01)

(58) Field of Classification Search
 CPC .............. G06F 8/71; G06F 8/61; G06N 20/00
 USPC ........................................................ 717/169
 See application file for complete search history.

(56) References Cited

U.S. PATENT DOCUMENTS

| | | | |
|---|---|---|---|
| 9,690,938 B1* | 6/2017 | Saxe | G06N 20/00 |
| 11,455,571 B2* | 9/2022 | Chauhan | G06N 20/00 |
| 2016/0253373 A1* | 9/2016 | Frye | G06F 8/65 707/695 |
| 2017/0104840 A1* | 4/2017 | Spagnola | H04L 67/306 |
| 2019/0339966 A1* | 11/2019 | Moondhra | G06F 16/9027 |
| 2019/0340059 A1* | 11/2019 | Bagarolo | G06F 8/71 |
| 2020/0097279 A1* | 3/2020 | Mukhopadhyay | G06F 8/65 |
| 2021/0141645 A1* | 5/2021 | Kramer | G06F 9/44505 |
| 2022/0278984 A1* | 9/2022 | Sarel | H04L 63/166 |

OTHER PUBLICATIONS

Rao1 et al, "Embedding Version Tag in Software File Deliverables before Build Release", 2015, [Online], pp. 1-6, [Retrieved from internet on Dec. 6, 2022], <https://ieeexplore.ieee.org/stamp/stamp.jsp?tp=&arnumber=7359255> (Year: 2015).*

* cited by examiner

Primary Examiner — S. Sough
Assistant Examiner — Zengpu Wei
(74) Attorney, Agent, or Firm — Caldwell Intellectual Property Law

(57) ABSTRACT

A system for version control is presented. The system includes a computing device, wherein the computing device is configured to receive a package build, wherein the package build a package build manifest, identify a package syntax element from the package build perform a manifest search as a function of the package syntax element, produce a universal version element as a function of the manifest search, verify the universal version element as a function of a version authenticator, and install the package build as a function of the verification.

20 Claims, 8 Drawing Sheets

US 11,586,436 B1

SYSTEMS AND METHODS FOR VERSION CONTROL IN A COMPUTING DEVICE

FIELD OF THE INVENTION

The present invention generally relates to the field of version control. In particular, the present invention is directed to systems and methods for version control in computing device.

BACKGROUND

Software updates, installations, and perhaps uninstallations incorporate some versioning to maintain and track upgradable or downgradable software. Every software package build may follow a variety of different conventions, rules, and labeling methods. Unreliable versioning may result in an improper installation of software that may not be upgradable or downgradable anymore. In some cases, informed users may want a variety of options for downgradable purposes. Users may have the freedom to select where to download some downgradable software from, however, the downgradable software may follow some unfamiliar semantic versioning, resulting in incompatible or unsuccessful installation. Software packages may come from a variety of locations in which each one may have its own history of libraries, builds, APIs, etc. Current versioning systems lack efficient documentation or repositories that efficiently track such histories, which may result in unmitigated installation problems.

SUMMARY OF THE DISCLOSURE

In an aspect, a system for version control is presented. The system includes a computing device, wherein the computing device is configured to receive a package build, wherein the package build includes a package build manifest, identify a package syntax element from the package build, perform a manifest search as a function of the package syntax element, produce a universal version element as a function of the manifest search, verify the universal version element as a function of a version authenticator, and install the package build as a function of the verification.

In another aspect, a method for version control in a computing device is presented. The method includes receiving a package build, wherein the package build includes a package build manifest, identifying a package syntax element from the package build, performing a manifest search as a function of the package syntax element, producing a universal version element as a function of the manifest search, verifying the universal version element as a function of a version authenticator, and installing the package build as a function of the verification.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
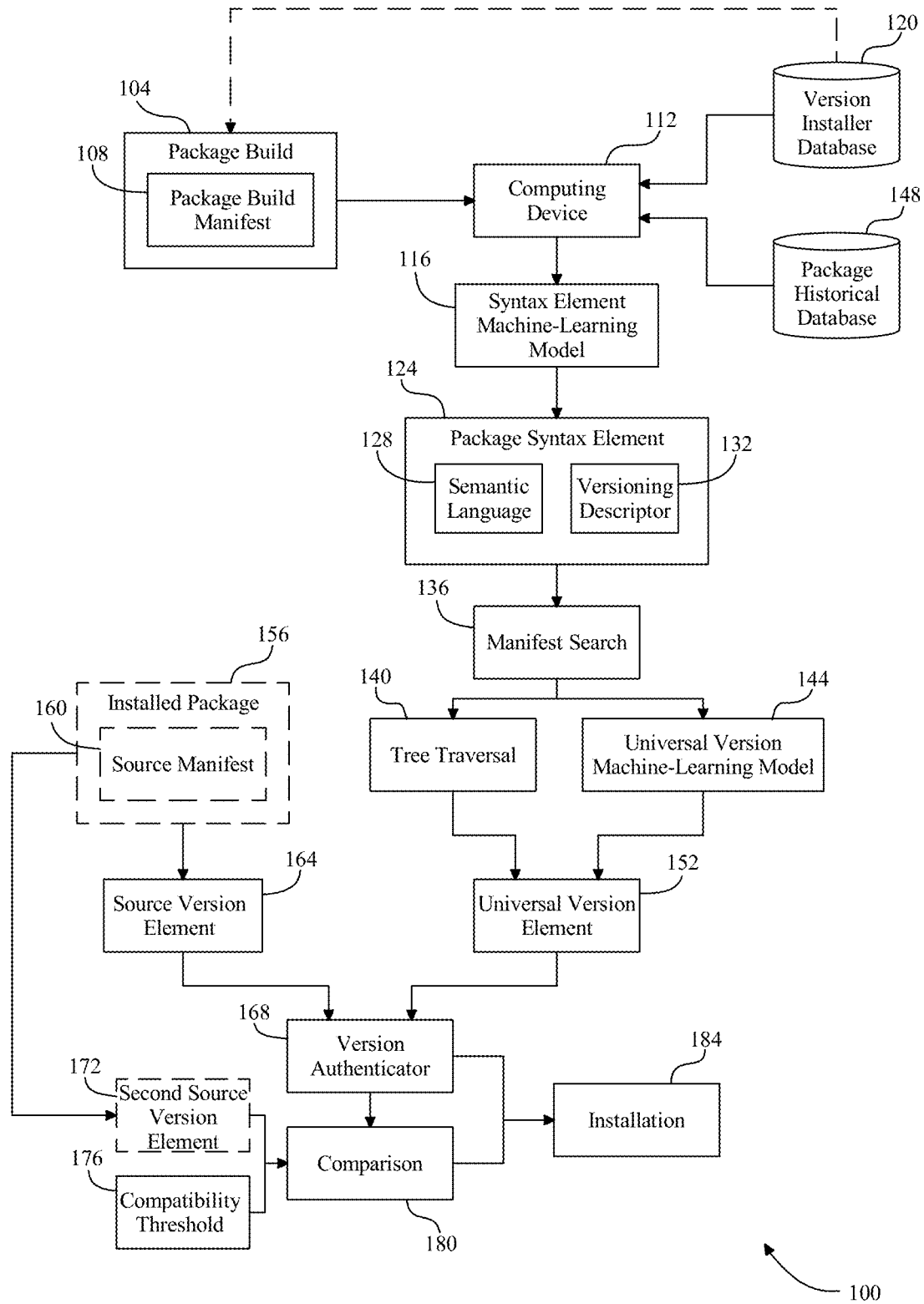
FIG. 1 is a block diagram of an exemplary embodiment of a system for version control in a computing device.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for version control in a computing device. In an embodiment, a computing device may install a different version of an installed package from a software package. The software package may not necessarily be an improved or newer version, and instead, the software package may include an older version of the installed package that a user prefers. Aspect of the present disclosure may identify the semantic language defining a package build's underlying software version. This is so, at least in part, to determine some compatibility that the software package may have with the installed package and/or computing device.

Aspects of the present disclosure can also be used to read a software package's metadata and perform a search on the manifest to produce a recognizable and universal semantic language associated with the installed package. In an embodiment, the software package manifest may include information about the software package such as version, libraries, APIs, and the like thereof. The manifest may also include security details, measures, and demands. In another embodiment, the software package build may include a build of a plurality of libraries incorporated from various sources. This "history" of components of the software package build may be in the form of a dependency tree. Aspects of the present disclosure can perform some search such as any tree traversal of the dependency tree to produce the recognizable and universal semantic language. In another embodiment, aspects of the present disclosure can allow for generating its own dependency tree based on the software package build's manifest and/or any recorded manifest data that may have been stored in an internal database. Aspects of the present disclosure can be used to map the contents of the manifest and/or the dependency tree to produce and/or identify the recognizable and universal semantic language. Aspects of the present disclosure may also include multiple databases to store some manifest of each software package, the installed package included, to better identify the semantic language of a software package.

This is so, at least in part, to create a robust database and an efficiently compounded identification of semantic languages in order to identify the software version of the software package for installation.

Aspects of the present disclosure can also be used to detect malicious software. In an embodiment, an automated system may identify elements within a software package's manifest and compare it to the manifest of that software recorded in an internal repository or database. In another embodiment, a computing device may determine a quantifier denoting some metric of maliciousness the pending software package may include compared to the data received from the internal repository or database. This is so, at least in part, to use a historical record to identify malicious attacks. Aspects of the present disclosure can also be used to generate an alert. In an embodiment, the alert may include a notification informing a user of the relative maliciousness and/or safety of a software package to be installed. In another embodiment, the relative maliciousness and/or safety may be determined based on a threshold that includes various ranges denoting the threat level of the software package. In another embodiment, the computing device may generate unique alerts associated a threat level. Exemplary embodiments illustrating aspects of the present disclosure are described below in the context of several specific examples.

Referring now to FIG. 1, an exemplary embodiment of a system 100 for version control in a computing device is illustrated. System 100 includes a computing device 112. computing device 112 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. computing device 112 may include a single computing device operating independently, or may include two or more computing device operating in concert, in parallel, sequentially or the like; two or more computing devices may be included together in a single computing device or in two or more computing devices. computing device 112 may interface or communicate with one or more additional devices as described below in further detail via a network interface device. Network interface device may be utilized for connecting computing device 112 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. computing device 112 may include but is not limited to, for example, a computing device or cluster of computing devices in a first location and a second computing device or cluster of computing devices in a second location. computing device 112 may include one or more computing devices dedicated to data storage, security, distribution of traffic for load balancing, and the like. computing device 112 may distribute one or more computing tasks as described below across a plurality of computing devices of computing device, which may operate in parallel, in series, redundantly, or in any other manner used for distribution of tasks or memory between computing devices. computing device 112 may be implemented using a "shared nothing" architecture in which data is cached at the worker, in an embodiment, this may enable scalability of system 100 and/or computing device.

With continued reference to FIG. 1, computing device 112 may be designed and/or configured to perform any method, method step, or sequence of method steps in any embodiment described in this disclosure, in any order and with any degree of repetition. For instance, computing device 112 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. computing device 112 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, computing device 112 is configured to receive a package build 104. A "package build," as used in this disclosure is a collection of files containing source code, executable code, or other forms of software, and information about those files. Package build 104 may include a software program, software application, and/or software assembly that is intended to be installed onto computing device 112, or another computing device. Such installation may replace an already installed package build, which may include a different version of the software and/or package build, such as installed package 156. For example and without limitation, a software assembly may include a collection of multiple built configuration items, some or all of which have their own development process and their own release identifiers. These complete items may be incorporated together into an assembly. In a non-limiting embodiment, package build 104 may include a library, interfaces, and/or collection of files that make up an application and/or program. For example, and without limitation, package build 104 may include a library comprising a single file containing one or more objects. In an embodiment, and without limitation, package build 104 may be linked in programs (dynamic link) and/or binary relocatable code incorporated into a calling program binary (static link). Dynamically linked libraries may be loaded into memory when first called and may be used by many programs. Dynamic libraries persist in memory as long as there is a link to them from an active program. Binary libraries may be prepared by a compiler from source code and the components packaged by a library archiver, part of a software development suite. Libraries for scripting languages may be simply a file containing a collection of function or object declarations in source code but may also contain compiled binary language extensions. In an embodiment, and without limitation, package build 104 may include a software package comprising a collection of files that make up an application or capability, which may include binary executables, libraries, source text files, documentation files, scripts, and the like thereof, however a library may sometimes be referred to as a package in certain language directives. In another embodiment, and without limitation, package build may include packages that may be built or installed by a system package manager or loaded into memory by a directive statement in a programming language. In another embodiment, and without limitation, package build may include one or more system packages that may become part of operating system resources and may be used by any script or program. Alternatively or additionally, package build 104 may include a plurality of package builds and/or a software suite. Persons skilled in the art, upon reviewing the entirety of this disclosure, will be aware of the various files, libraries, collections in the context of software installation.

Still referring to FIG. 1, package build 104 may include at least an element of package build metadata associated with package build 104. A "package build metadata," as used in this disclosure is data that identifies one or more unique and/or distinct elements of package build 104. For instance and without limitation, package build metadata may be consistent with software component metadata in U.S. patent application Ser. No. 17/460,611 and entitled, "SYSTEM FOR AUTOMATED MALICIOUS SOFTWARE DETECTION," which is incorporated by reference herein in its entirety. Computing device 112 may identify package build metadata as a function of receiving package build 104. In an embodiment, and without limitation, the package build metadata may include a package name. As used in this disclosure a "package name" is a unique identifier, name, and/or label of a software component. For example, package name may include a name as typed (NAT), such as but not limited to a software label, library name, and the like thereof. In an embodiment, and without limitation, package name may include a naming standard. For example, a naming standard may include a prepend comprising a string of characters, symbols, letters, special characters, and the like thereof and/or an append comprising a string of characters, symbols, letters, special characters. For example, and without limitation, package name may prepend "ABC_" to all names of the package build metadata. As a further non-limiting example, package name may include a unique identifier comprising an append "ftp-transport" to all names of the package build metadata. Additionally or alternatively, the package build metadata may include a metadata element such as but not limited to structural metadata, guide metadata, technical metadata, process metadata, business metadata, descriptive metadata, administrative metadata, preservation metadata, rights management metadata, accessibility metadata, and the like thereof.

With continued reference to FIG. 1, package build 104 may include a package build manifest 108. A "package build manifest," as used in this disclosure, is a file and/or a collection of files containing package build metadata of a package build. In a non-limiting embodiment, package build manifest 108 may describe a name, software version number, license, and/or any constituent file of a software program, software application, and/or software assembly in package build 104. In another non-limiting embodiment, package build manifest 108 may contain security demands to verify a software program, software application, and/or software assembly. Package build manifest 108 may also include names and hashes of all files that make up package build 104 and its contents. In a non-limiting embodiment, package build manifest 108 may include a cryptographic hash of different modules in package build 108. Persons skilled in the art, upon reviewing the entirety of this disclosure, will be aware of the various contents and information in the context of software manifest as used in this disclosure.

Still referring to FIG. 1, package build manifest 108 may include information involving one or more download counts, wherein a download count is an actual number of downloads for a package or library or a bucketization of download counts (the numbers broken into discrete bins). For instance and without limitation, bucketization may be consistent with the bucketization in U.S. patent application Ser. No. 17/460,611. As a further non-limiting example, package build manifest 108 may include one or more contributor counts, wherein a contributor count is an actual number of contributors for a package or library or a bucketization of contributor counts (the numbers broken into discrete bins). As a further non-limiting example, package build manifest 108 may include one or more release counts, wherein a release count is an actual number of releases for a package or library or a bucketization of release counts (the numbers broken into discrete bins). As a further non-limiting example, package build manifest 108 may include a bucketization of time, wherein a bucketization of time is an amount of time between a first and last release of numbers broken into discrete bins. As a further non-limiting example, package build manifest 108 may include a release per period, wherein a release per period is a time between releases over a period of time or a bucketization of the release per period (the numbers broken into discrete bins). As a further non-limiting example, package build manifest 108 may include NLINES, wherein NLINES are numbers of lines added, changed and/or deleted per a period of time or a bucketization of the number of lines per a period (the numbers broken into discrete bins). As a further non-limiting example, package build manifest 108 may include a commit history, wherein a commit history is a number of commits per a period of time or a bucketization of the number of commits per a period of time (the number broken into discrete bins). As a further non-limiting example, package build manifest 108 may include a package description, wherein a package description is descriptive data denoting an author, the location of the repository, version histories, and the like thereof. As will be appreciated by persons having ordinary skill in the art, the foregoing list is provided by way of example and other metadata can be added as an extension or fine tuning of the algorithms disclosed herein.

As a further non-limiting example, and with further reference to FIG. 1, package build manifest 108 may also comprise a code complexity and history, wherein a code complexity and history are an automated measure of code complexity changes with a new version might indicate a malicious package or library. As a further non-limiting example, package build manifest 108 may comprise a number of other packages or libraries to be included and history, wherein a number of other packages or libraries to be included and history is the total number of files the package or library contains. As a further non-limiting example, package build manifest 108 may comprise a number of other packages and libraries included, wherein a number of other packages and libraries included is the number of other packages and libraries the specified package or library utilizes, wherein a higher number may be an indicator of legitimacy. As a further non-limiting example, package build manifest 108 may include a repository commit detail, wherein a repository commit detail is a message and/or code that may indicate legitimacy. As a further non-limiting example, package build manifest 108 may include a repository issue text, wherein a repository issue text is text about possible issues with a package and/or library. As a further non-limiting example, package build manifest 108 may include one or more repository subscriber counts, stars and/or likes. As a further non-limiting example, package build manifest 108 may include a repository URL and/or history, wherein a repository URL and/or history is a package and/or library with the same name. As a further non-limiting example, package build manifest 108 may include a repository user and/or contributor detail and/or history, wherein a repository user and/or contributor detail and/or history is a tracked activity of the user and/or account details.

With continued reference to FIG. 1, package build manifest 108 may include a security component and a dependency component. A "security component," as used in this disclosure, is a security demand and/or requirement that a software program and/or assembly of package build 104 requires. For example and without limitation, a security component may include a requirement of "asInvoker" security level which means it can be operated at whatever security level it is executed. A "dependency component," as used in this disclosure is a requirement of package build 104 that it relies on. For example and without limitation, the dependency component may include a requirement that package build 104 needs a component called "Microsoft.VC90.CRT" with version number "9.0.21022.8." Persons skilled in the art, upon reviewing the entirety of this disclosure, will be aware of the various embodiments and components of a software manifest for purposes as described herein.

Still referring to FIG. 1, package build manifest 108 may include a plurality of downloads of previous builds and/or information of those previous builds. For example and without limitation, package build 108 may have incorporated a plurality of builds including libraries, assemblies, APIs, interfaces, etc. Package build 108 and its contents containing a plurality of individual components, such as an API, library, output, license, etc., may each have their own version number associated with it that package build 108 depends on. Each of those components may also depend on other software components that are incorporated into the parent software component, resulting in some chain of dependencies. Furthermore, each component may have its own history of incorporated builds and downloads.

Further referring to FIG. 1, a history of downloads and/or information may further include a plurality of software manifests. In a non-limiting embodiment, package build manifest 108 and its dependency component may include a tree configuration. In another non-limiting embodiment, computing device 112 may be configured to generate a manifest dependency tree. A "manifest dependency tree," as used in this disclosure is an acyclic graph with components of package build manifest 108 as nodes and relations as edges. Manifest dependency tree may include nodes wherein each node includes a dependent software program of package build 104 and its version number. Alternatively or additionally, nodes may include a name of a dependent software program and its version number. In some embodiments, each dependent software program may include its own set of dependent software programs. Alternatively or additionally, a manifest dependency tree may include nodes wherein the nodes of previous builds are incorporated into package build 104. For example and without limitation, previous users may have modified package build 104 in which a manifest dependency tree acts as a repository. A manifest dependency tree may include nodes of math library that was incorporated, a version of a language processing library that was incorporated, and the like thereof. In a non-limiting embodiment, computing device 112 may generate a manifest dependency tree in a configuration that specifies attributes that are placed in a dependency component of package build manifest 108. For example and without limitation, a root of a manifest dependency tree may include a version number of package build 104. Nodes of a manifest dependency tree may include dependent software programs and its version numbers such as APIs, libraries, licenses, etc. In some embodiments, nodes of dependent software programs may be parent nodes in which child nodes include other dependent software programs that the parent nodes depend on. In another non-limiting embodiment, a leaf node may include a dependent software program that is a first installment and/or version release in which no other software program depends on. Alternatively or additionally, a manifest dependency tree may be a graph. Persons skilled in the art, upon reviewing the entirety of this disclosure, will be aware of generating and/or reading a tree of dependency components comprised in a manifest for purposes as described herein.

With continued reference to FIG. 1, computing device 112 may be configured to identify a package syntax element 124 from package build 108. A "package syntax element," as used in this disclosure, is an element of a semantic language 128 associated with a version of package build 104 and/or a software program in package build 104 which may be represented as a sequence of text, strings, characters, and the like thereof. Alternatively or additionally, package syntax element 124 may include an associated version number of package build 104. For example and without limitation, package syntax element may include "2.1.0," "2.1.*," "^2.1.0," and the like thereof. A "semantic language," as used in this disclosure, is a versioning format that a package build follows that describes the assigned and/or incremented version numbers of the package build. In a non-limiting embodiment, semantic language 128 denoting one or more versions and/or version ranges may be composed of a sequence of numbers and characters. A package build may include a version number in the format of X.Y.Z. Computing device 112 may be configured to declare a public application programming interface (API) of package build 104. In some exemplary version numbers, an "X" represents a major version, wherein the major version indicates a major change to a software of package build 104 that is incompatible to an API, in which update is required. "Y" may, in a non-limiting illustrative example, represent a minor version, wherein a minor version indicates minor changes to software without breaking an API of package build 104 and is backward compatible. In a non-limiting and illustrative example, "Z" may represent backward compatible bug fixes. Persons skilled in the art, upon reviewing the entirety of this disclosure, will be aware of the various embodiments of incremental and backward compatible version numbers and numbering formats.

Continuing to refer to FIG. 1, a manifest dependency tree may be configured to read string distances between periods delineating a type of version package build 104 may include. For example and without limitation, a version number of a package build may include "X.Y-beta-.Z." A "beta" in between two delineating periods, or in a minor version, may represent a descriptor that indicates application is a beta version that may be accepted because a prerelease dependency notation of "-beta" means that prerelease versions are acceptable if the prerelease evaluates to greater than or equal to the beta prerelease. In another embodiment, semantic language 128 may denote one or more versions and/or version ranges may be composed of a sequence of numbers and characters. For example and without limitation, the sequence of text comprising 2.1. * may represent a version range of ">=2.1.0 and <3.0.0". Persons skilled in the art, upon reviewing the entirety of this disclosure, will be aware of the additional descriptors and ranges of version numbers in the identification of a version number.

As a non-limiting and illustrative example, and with continuing reference to FIG. 1, "~2" or "^2" or "2.*" or "2.x" may all be ways in which a system and/or installation package may represent versions ">=2.0.0 and <3.0.0"; "~2.4" or "^2.4" or "2.4.*" or 2.4.x" may all be ways in which a system and/or installation package may represent versions ">=2.4.0 and <2.5.0"; and "~2.2.0" or "^2.2.0" or "2.2.*" or "2.2.x" may all be ways in which a system and/or installation package may represent versions ">=2.2.0 and <2.3.0" in some embodiments. As a further non-limiting example, "(1.0,)" may be a way in which a system and/or installation package may represent versions ">1.0.0"; "[1.0,)" may be a way in which a system and/or installation package may represent versions ">=1.0.0"; "(,1.0)" may be a way in which a system and/or installation package may represent versions "<1.0.0"; "(1.0]" may be a way in which a system and/or installation package may represent versions "<=1.0.0"; "(1.0,2.0]" may be a way in which a system and/or installation package may represent versions ">1.0.0 and <=2.0"; "[1.0,2.0)" may be a way in which a system and/or installation package may represent versions ">=1.0.0 and <2.0"; and "[1.0,2.0)" may be a way in which a system and/or installation package may represent versions ">=1.0.0 and <2.0" in some embodiments. As a further non-limiting example, "~1.2" may be a way in which a system and/or installation package may represent ">=1.2.0 and <1.3.0"; "!=1.2.2" may be a way in which a system and/or installation package may represent any version that is not equal to "1.2.2"; and "~=1.2, !=1.2.2, <2.0" may be a way in which a system and/or installation package may represent complex version syntax which includes versions that are ">=1.2.0 and <2.0.0" but excludes "1.2.2". Persons skilled in the art, upon reviewing the entirety of this disclosure, will be aware of various alternative or additional ways in which version statements may be formed and/or represented, and various forms of syntax for so doing.

Still referring to FIG. 1, package syntax element 124 may be identified as a function of a syntax element machine-learning model 116. A "syntax element machine-learning model," as used in this disclosure, is any machine-learning model configured to receive package build 104 and/or its contents such as package build manifest 108 and output package syntax element 124 using a syntax element training set. A "syntax element training set," as used in this disclosure, is a training set configured to train syntax element machine-learning model 116. A syntax element training set may include a plurality of string descriptors correlated to a plurality of semantic identifiers. A "string descriptor," as used in this disclosure, is a measurable value of a string representing an identifier for package build 104. For example and without limitation, package build manifest 108 may include a version number of "1.2.1*" in which the "*" represents a string descriptor. To an unfamiliar computing device, the "*" may include some information that the unfamiliar computing device may not know. Alternatively or additionally, the "*" may not have any significance to an unfamiliar computing device. Computing device 112 may correlate a string descriptor to a semantic identifier. A "semantic identifier," as used in this disclosure is a measurable value representing a pattern, rule, and/or schema of a semantic versioning of package build 104. In a non-limiting embodiment, the semantic identifier may indicate package build 104 may be backward compatible. In another non-limiting embodiment, the semantic identifier may be consistent with semantic language 128 and/or include an element of semantic language 128 as described herein.

With continued reference to FIG. 1, computing device 112 may be configured to retrieve a syntax element training set from a package historical database 148. A "package historical database," as used in this disclosure, is a repository configured to store a plurality of package builds and a plurality of package manifests. Package historical database 148 may store a plurality of semantic languages, semantic identifiers, string descriptors, version descriptors, and the like thereof. Package historical database 148 may store a plurality of package syntax elements, universal version elements, manifest dependency trees, and the like thereof. In a non-limiting embodiment, package historical database 148 may include a plurality of recorded package syntax elements in which computing device 112 may retrieve a syntax element training set with the correctly correlated semantic identifier. Package historical database 148 serves to create a robust repository that in part is used to assist in the training of syntax element machine-learning model 116. Persons skilled in the art, upon reviewing the entirety of this disclosure, will be aware of storing recorded data in the context of robust databases.

Still referring to FIG. 1, any database, such as package historical database 148 and/or version installer database 120 may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

Still referring to FIG. 1, package syntax element 124 may include a version number following semantic language 128 in which semantic language 128 uses unique preceding and/or following string descriptors. For example and without limitation, package build 104 and its package syntax element 124 may include a version number of "^1.2.1" in which the "^" represents an inclusive range indicator synonymous to "[" in most semantic versioning. However, in other dependent software programs and/or other software packages, the "^" may be used in a completely different method in which the "^" may be an exclusive range indicator synonymous to "(". In another embodiment, a unique string may indicate the package build is some type of update, upgrade, or downgrade. For example and without limitation, version numbers of 1.0 or 1.0.x may allow all patches of 1.0 to be installed. In another non-limiting example, ~1.0.4 may only allow patches up to 1.0.4. In another non-limiting example, a version number 1 or 1.x may allow all patches and minor updates to 1. A version number of ^1.0.4 may allow patches and minor updates to 1.0.4. Computing device 112 may be configured to identify a semantic versioning rule and/or format for each software package and/or dependent software program. Computing device 112 may be configured to identify a versioning descriptor 132 of package syntax element 124. A "versioning descriptor," as used in this disclosure, is an identifier denoting the core parts of a version number. In a non-limiting embodiment, package syntax element 124 may include a plurality of versioning descriptors. For example and without limitation, versioning descriptor 132 may denote that package syntax element 124 includes a major version update, minor version update, patch version update, and/or pre-release version update. In a semantic versioning format of X.Y.Z, "X" may denote the major version update, "Y" may denote the minor version update, and "Z" may denote the patch version update. A version number may include additional strings that may be specified by hyphens and one or more period separated identifiers denoting a pre-release version update. For example and without limitation, in 1.2.4-alpha.1, -alpha.1 is a pre-release part that has two pre-release identifiers. In pre-release, software may not be stable and might not satisfy the compatibility requirements implied by the normal version 1.2.4. In another non-limiting embodiment, version descriptor 132 of a version number of package syntax element 124 may include a plus sign followed by a period separated identifier. For example and without limitation, in 1.0.0-beta+exp.sha.5114f85, +exp.sha.5114f85 is the build part that has three build identifiers. 1.0.0+20130313144700 is an example with package build information but not a pre-release. Persons skilled in the art, upon reviewing the entirety of this disclosure, will be aware of the various combinations and descriptors in the context of semantic versioning.

With continued reference to FIG. 1, computing device 112 may be configured to perform a manifest search 136 as a function of package syntax element 124. A "manifest search," as used in this disclosure, is a search of the contents of package build 104 and its contents. Manifest search 136 may include reading the package build metadata and/or package build manifest 108. Computing device 112 may then identify the plurality of software components, programs, applications, etc., comprised within package build 104 along with each of their version numbers. Computing device 112 may also search through the plurality of dependencies of software components comprised in package build 104. Computing device 112 may further identify the version number associated with each dependent software component. In a non-limiting embodiment, computing device 112 may perform manifest search 136 to identify a range of version numbers that make up package build 104 and consolidate them into a single version number.

Still referring to FIG. 1, manifest search 136 may include a tree traversal 140. A "tree traversal," as used in this disclosure, is a search of a tree configured to identify the plurality of version numbers of software components and programs within manifest dependency tree; tree traversal may include without limitation, traversal of manifest dependency tree. In a non-limiting embodiment, tree traversal 140 may include, without limitation, in-order traversal, preorder traversal, postorder traversal, level order traversal, and the like thereof. computing device 112 may perform manifest search 136 in order to produce a universal version element 152. For example and without limitation, a root of manifest dependency tree may include a version number of package build 104. Version number of a root may be "3.0.0." Nodes and lowest level leaf may include a version number of "^2.0.0." Tree traversal 140 may indicate that manifest search 136 identified a range of version numbers that preserves dependency and to avoid dependency hell in future installation. "Dependency hell," as used in this disclosure, is a situation in which dependency issues arise when several packages have dependencies on the same shared packages or libraries, but they depend on different and incompatible versions of the shared packages. Persons skilled in the art, upon reviewing the entirety of this disclosure, will be aware of the various embodiments of identifying version numbers in the context of avoiding incompatible versions.

Still referring to FIG. 1, computing device 112 may be configured to produce a universal version element 152 as a function of manifest search 152. A "universal version element," as used in this disclosure, is a single and/or universal version element denoting package build 104 which consistently refers to identical versions of software and/or packages regardless of the original syntax in which such versions were denoted for such packages. In other words, computing device 112 may map version numbers and/or other package build syntax elements as described in various package build syntaxes to universal version elements, such that all versions of all packages and/or elements included therein are described in a common versioning syntax. For example and without limitation, a version number of a root of manifest dependency tree may be "3.0.0" while nodes and lowest level leaf may include a version number of "^2.0.0." A non-limiting illustrative example of a universal version element 152 may include a version number of 2.1.1. In another non-limiting example, computing device 112 may produce universal version element 152 of [2.1,3] as a function of a sequence of characters, strings, numbers, version descriptors, semantic identifiers, package syntax elements, or combination thereof, in which a combination comprises a version number of 2.1*. In some embodiments, universal version element 152 may include a single universal version number and/or a range of universal version numbers that are compatible. Compatibility may include correctness of version numbers of dependencies of package build 104 and/or of dependencies of installed package 156 in relation to package build 104. Persons skilled in the art, upon reviewing the entirety of this disclosure, will be aware of the various embodiments of producing a universal version number in the context of dependency and compatibility.

With continued reference to FIG. 1, universal version element 152 may be generated as a function of a universal version machine-learning model 144. A "universal version machine-learning model," as used in this disclosure, is any machine-learning model configured to receive package syntax element 124 as an input and output universal version element 152 as a function of a version training set. A version training set may include a training set configured to train universal version machine-learning model 144 wherein the version training set includes a plurality of sequences of version numbers correlated to a plurality of universal version elements. A "sequence of version numbers," as used in this disclosure, is a range of version strings, characters, texts, numbers, and the like thereof, denoting compatible version numbers of package build 104. In a non-limiting embodiment, a sequence of version numbers may be a result of tree traversal 140. In some embodiments, computing device 112 may retrieve the version training set from a version installer database 120. In another non-limiting embodiment, a user could have inputted and/or assigned a version number along with data indicating what package, installer, and/or any related software that version corresponds to, in which computing device 112 may record into version installer database 120. A "version installer database," as used in this disclosure, is a repository of installable version numbers and/or software package builds. An "element of universal version element," as used in this disclosure, is some universal version element that best associates with the sequence of version numbers from manifest search 136 and/or tree traversal 140. For example and without limitation, manifest search 136 and/or tree traversal may output a range of compatible version numbers in which computing device 112 may retrieve a version training set comprising a best correlated element of universal version element based on the range. The resulting universal version element 152 that may be outputted may include the median version number of a range of compatible version numbers, the highest version number of the range of compatible version numbers, and/or the lowest version number of the range of compatible version numbers. In a non-limiting embodiment, version installer database 120 may include a plurality of package builds that a user may select from to be installed over installed package 156 of computing device 112. Persons skilled in the art, upon reviewing the entirety of this disclosure, will be aware of the various embodiments of producing the universal version element in the context of machine-learning.

With continued reference to FIG. 1, computing device 112 may be configured to verify universal version element 152 as a function of a version authenticator 168. A "version authenticator," as used in this disclosure, is an identifier configured to determine whether universal version element 152 is compatible and/or allowable according to configuration of system 100. In some embodiments, version authenticator 168 may include some software/hardware module. In another embodiment, version authenticator 168 may include an allowable version or range of allowable versions that package build 104 is compatible with. In a non-limiting embodiment, version authenticator 168 may be the same as universal version element 152. In another non-limiting embodiment, version authenticator 168 may include an allowable version for package build 104 that is also compatible with installed package 156. An "installed package," as used in this disclosure, is a software program and/or application that is already installed within computing device 112 that package build 104 may be attempting to replace, upgrade, update, patch, etc. Version authenticator 168 may be retrieved from any database as described herein such as version installed database 120. Installed package 156 may include its own dependencies, dependent software components, and manifest dependency tree. Installed package may include its own software metadata. For instance and without limitation, an installed package metadata may be consistent with the source metadata in U.S. patent application Ser. No. 17/460,611. Installed package 156 may source manifest 160. A "source manifest," as used in this disclosure, is the software manifest of installed package 156. Source manifest 160 may be similar to package build manifest 108. In a non-limiting embodiment, installed package 156 may have been previously denoted by a previous universal version element such as a source version element 164 as a function of a manifest search done to installed package. A "source version element," as used in this disclosure, is a universal version element associated with installed package 156. Computing device 112 may be configured to verify universal version element 152 by comparing it to source version element 164. In some embodiments, computing device 112 may retrieve a plurality of compatible versions, version numbers, version range, and the like thereof, from version installer database 120.

Still referring to FIG. 1, as used in this disclosure, "verification" is a process of ensuring that which is being "verified" complies with certain constraints, for example without limitation system requirements, regulations, and the like. In some cases, verification may include comparing a product, such as without limitation universal version element 152 against one or more acceptance criteria. For example, in some cases, universal version element 152 may be required to a specific allowable version or range denoted by version authenticator 168 and source version element 164. Ensuring compliance with acceptance criteria may, in some cases, include verification. In some cases, verification may include ensuring that data is complete, for example that all required data types, are present, readable, uncorrupted, and/or otherwise useful for computing device 112. In some cases, some or all verification processes may be performed by computing device 112. In some cases, at least a machine-learning process, such as a machine-learning model, may be used to verify. Computing device 112 may use any machine-learning process described in this disclosure for this or any other function. In some embodiments, at least one of validation and/or verification includes without limitation one or more of supervisory validation, machine-learning processes, graph-based validation, geometry-based validation, and rules-based validation. As used in this disclosure, "validation" is a process of ensuring that which is being "validated" complies with stakeholder expectations and/or desires. Stakeholders may include users, administrators, property owners, customers, and the like. Very often a specification prescribes certain testable conditions (e.g., metrics) that codify relevant stakeholder expectations and/or desires. In some cases, validation includes comparing a product, for example without limitation universal version element 152, against a specification. In some cases, computing device 112 may be additionally configured to validate a product by validating constituent sub-products. In some embodiments, computing device 112 may be configured to validate any product or data, for example without limitation universal version element 152. In some cases, at least a machine-learning process, for example a machine-learning model, may be used to validate by computing device 112. Computing device 112 may use any machine-learning process described in this disclosure for this or any other function.

With continued reference to FIG. 1, computing device 112 may be configured to verify universal version element 152 as a function of a comparison. A "comparison," as used in this disclosure, is a comparison of the string distance between universal version element 152 and version authenticator 168. Furthermore, comparison 180 may include comparing universal version element 152 to source version element 164. In a non-limiting embodiment, computing device 112 may have access to the plurality of incorporated builds of installed package 156 which may be recorded in package historical database 148. Source version element 164 may be generated as a function of some range of version numbers resulting from a manifest search and/or tree traversal. That range may be denoted by a compatibility threshold 176. In an embodiment, the allowable range of version numbers denoted by version authenticator 168 may include a compatibility threshold 176. A "compatibility threshold range," as used in this disclosure, is a limit and/or threshold that denotes high likelihood of a compatibility for package build 104 to be installed over installed package 156. In an embodiment, and without limitation, compatibility threshold 176 may denote that any semantic language and/or range of version numbers that is less than the threshold may indicate that package build 104 is highly compatible for installation. In another embodiment, and without limitation, compatibility threshold 176 may denote that any semantic language and/or range of version numbers that exceeds and/or is greater than the threshold value may indicate a potential dependency hell or an absolute indication of incompatibility. Alternatively or additionally, compatibility threshold 176 may include a range with inclusive and/or exclusive limits on the increments of major updates, minor updates, patch updates, and the like thereof. A "versioning descriptor range," as used in this disclosure, is a range of version numbers denoted by one or more version descriptors. In some embodiments, compatibility threshold 176 may be consistent with version authenticator 168. For example and without limitation, version authenticator 168 may include a range of "~1.0.1" to "^1.0.9". This range indicates that any patch from package build 104 based on universal version element 152 between 1.0.1 to 1.0.9 is allowable and/or compatible. Persons skilled in the art, upon reviewing the entirety of this disclosure, will be aware of the various embodiments and ranges of version numbers in the context of maintaining dependency and compatibility.

As used in this disclosure a "string distance" is a quantitative measurement of space that exists between universal version element 152 and version authenticator 168. In some embodiments, the string distance may include a quantitative measurement of space that exists between universal version element 152 and source version element 164. In an embodiment, and without limitation, string distance may include a string metric, wherein a string metric is a metric that measures a distance between two text strings. In an embodiment, and without limitation, string metric may include a Levenshtein distance, wherein a Levenshtein distance is a distance between two input strings, wherein the distance is equivalent to the number of substitutions and/or deletions needed in order to transform a first input string to a second input string. In an embodiment, and without limitation, string metric may include one or more metrics denoting a difference as a function of phonetic, token, grammatical, and/or character-based methods of statistical comparisons. In an embodiment, string distance may be unique to other distances as a closer distance may indicate a more compatible name/version in software package build manifest 108 when compared to package historical database 148. For example, and without limitation, a distance of 0, an exact match, may carry the greatest contributing factor to the equation, wherein assuming the selected string comparison function returns a VALUE, and that VALUE is 0 for an exact match and some number N for "not similar", the NEWVALUE used in the equation may be achieved by subtracting the computed string distance from a positive maximum value, N. Computing device 112 may identify string distance as a function of a name/version matching algorithm. As used in this disclosure a "name/version matching algorithm" is a function and/or algorithm that is used to compute a distance between the software component metadata and/or source repository metadata. In an embodiment, and without limitation, name/version matching algorithm may be constructed manually using weights and algorithms or constructed via machine learning from examples (e.g., using examples of good packages and suspect packages). This may include classifiers (Bayes, Naïve Bayes, etc.), gradient descent algorithms, logistic regression, boosted gradient trees, neural networks or other known algorithms which can use these distance computations to adjust for a signaling event. As a non-limiting example, name/version matching algorithm may include one or more natural language processing modules, wherein a natural language processing module is described above. As a further non-limiting example, name/version matching algorithm may include one or more functions such as a Damerau-Levenshtein, q-gram, Cosine distance, Jaccar, and the like thereof. In an embodiment, and without limitation, name/version matching algorithm may remove and/or replace one or more non-alphanumeric characters such as but not limited to characters comprising "-, ( ), !, @, #, $, %, ^, &, *, [ ], { }, and the like thereof. Additionally, name/version matching algorithm may average different algorithms as well as dividing by total character count to compute a percentage can also improve matching. In an embodiment, and without limitation, name/version matching algorithm may reflect the actual likelihood of a "near match" and/or an exact match. In an embodiment, and without limitation, name/version matching algorithm may determine one or more string distances as a function of the plurality of metadata embedded within package build 104, such as package build manifest 108, and/or package historical database 148. In another embodiment name/version matching algorithm may determine a Levenshtein distance, Sorensen-Dice coefficient, block distance, Hamming distance, Jaro-Winkler distance, simple matching coefficient, Jaccard similarity, Tversky index, overlap coefficient, variational distance, Hellinger distance, information radius, skew distance, confusion probability, Tau metric, Fellegi and Sunters metric, maximal match, grammar-based distance, TFIDF distance, and the like thereof.

In an embodiment, and still referring to FIG. 1, name/version matching algorithm may identify a string distance as a function of a distance function for two values of the same parameter such as a version parameter. A distance algorithm for each parameter may be unique. Uniqueness of an algorithm may be determined by looking through metadata in a particular repository to find proper boundaries, ranges, and distributions of data. For example, and without limitation, distance algorithm may determine a distance between download counts for the name/version as typed package and/or library and package historical database 148. As a further non-limiting example, distance algorithm may determine a distance between contributor counts for the name/version as typed package and/or library and package historical database 148. In another non-limiting example, a string distance algorithm may determine a distance between release counts for the name/version as typed package and/or library and package historical database 148. As a further non-limiting example, distance algorithm may determine a distance between release counts for the name/version as typed package and/or library package historical database 148. As a further non-limiting example, distance algorithm may determine a distance between time first to last release for the name/version as typed package and/or library and package historical database 148. As a further non-limiting example, distance algorithm may determine a distance between release per period for the name/version as typed package and/or library and package historical database 148. As a further non-limiting example, distance algorithm may determine a distance between commits per period for the name/version as typed package and/or library package historical database 148. As a further non-limiting example, distance algorithm may determine a distance between the number of lines for the name/version as typed package and/or library and the source repository. As a further non-limiting example, distance algorithm may determine a distance between package description for the name/version as typed package and/or library and a source repository. In an embodiment, and without limitation, distance algorithm may include one or more using machine learning modules as described above; this may include classifiers (Bayes, Naïve Bayes, etc.), gradient descent algorithms, logistic regression, boosted gradient trees, neural networks or other known algorithms which can use these distance computations to adjust for a signaling event. In another non-limiting embodiment, any machine-learning model, algorithms, and/or modules as described herein may include a classifier configured to classify an element of any syntax element to a universal version element.

Alternatively or additionally, and still referring to FIG. 1, comparison 180 may serve as a second level of verification in the event version authenticator 168 fails to find compatibility and/or allowability of universal version element 152. For example and without limitation, version authenticator may determine that universal version element 152 is incompatible in respect to installed package 156 and its dependencies. However, source version element 164 may have been generated that may exclude the version number denoted by universal version element 152 of package build 104. In a non-limiting embodiment, computing device 112 may reproduce source version element 164, as a function of any manifest search to potentially result in a second source version element 172 that may be compatibility with universal version element 152 via version authenticator 168. A "second source version element," as used in this disclosure, is a new source version element of installed package 156. Second source version element 172 may be generated by any manifest search, tree traversal, and/or machine-learning model. In a non-limiting embodiment, second source version element 172 may be produced by performing a second tree traversal of the manifest dependency tree of installed package 156 and/or retrieving a range of version numbers resulting from the original tree traversal of a package syntax element of installed package 156, in which computing device 112 may select a second source version element 172 as a function of package build 104 input. In another embodiment, second source version element 172 may be outputted by a machine-learning model such as universal version machine-learning model 144 which receives the package syntax element of installed package 156 as an input and trained by the version training set used for package build 104. In other words, second source version element 172 may be compared with compatibility threshold 176 to generate a new verification that may potentially verify universal version element 152. Alternatively of additionally, a new verification and/or comparison may result in a change to the metric that version authenticator 168 uses to verify universal version element 152. This may be because computing device 112 may have generated a source version element, wherein the source version element is a consolidation/simplification of all the versions of software components of installed package 156. Computing device 112 may have to reproduce a new consolidated/simplified source version element to check if universal version element 152 is allowable.

With continued reference to FIG. 1, computing device 112 may be configured to install package build 104 as a function of a successful verification. Installation 184 may be performed as a function of some installer program. An installer program may be retrieved from version installer database 120. Persons skilled in the art, upon reviewing the entirety of this disclosure, will be aware of the various embodiments and components in the installation of a new software package.

Figure 2:
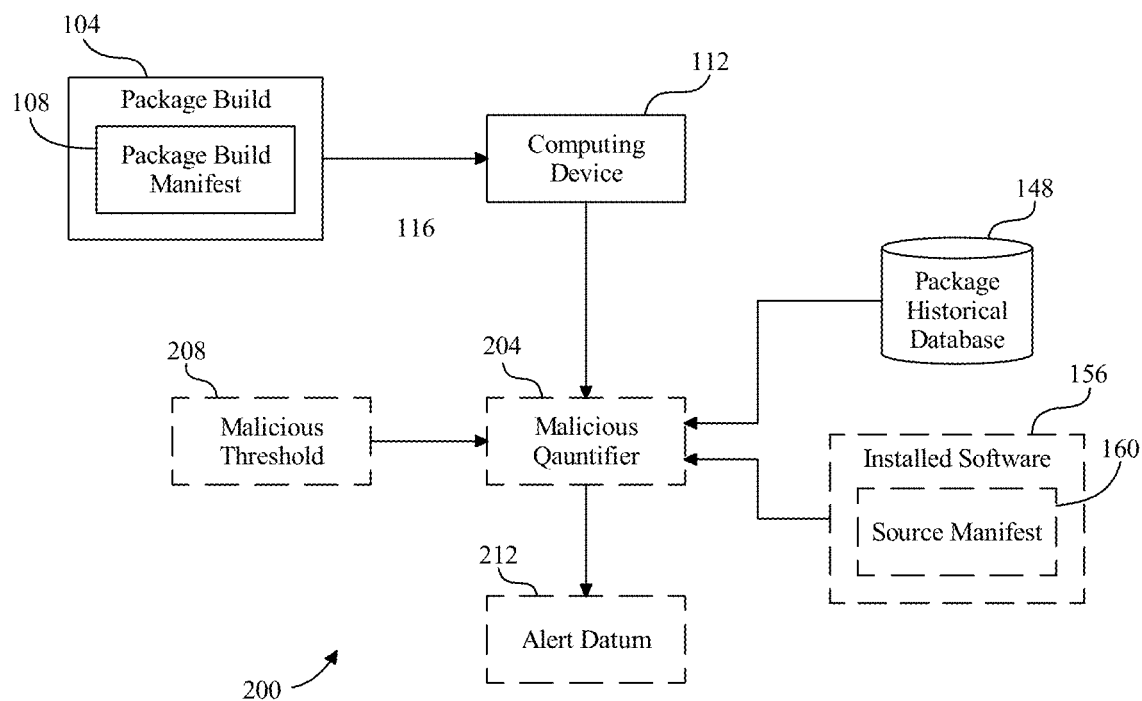
FIG. 2, is a block diagram of an exemplary embodiment of a system for a malicious software detection according to an embodiment of the invention.

Referring now to FIG. 2, a block diagram of an exemplary embodiment of a system 200 for a malicious software detection is illustrated. For instance and without limitation, system 200 may be consistent with the automated malicious software detection of U.S. patent application Ser. No. 17/460,611. In a non-limiting embodiment, computing device 112 may be configured to determine a malicious quantifier 204 as a function of package build 104 and/or package manifest 108. As used in this disclosure a "malicious quantifier" is a measurable value denoting the likelihood of the presence of malicious software and/or malicious components. In an embodiment, and without limitation, software and/or components may include software and/or components such as but not limited to ransomware, fileless malware, spyware, adware, trojans, worms, rootkits, keyloggers, bots, mobile malware, and the like thereof. In an embodiment, and without limitation, malicious quantifier may include a malicious vector. As used in this disclosure a "malicious vector" is a vector denoting a likelihood of the presence of malicious software, wherein a "vector" as defined in this disclosure is a data structure that represents one or more quantitative values and/or measures the likelihood of the presence of malicious software. A vector may be represented as an n-tuple of values, where n is one or more values, as described in further detail below; a vector may alternatively or additionally be represented as an element of a vector space, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent, for instance as measured using cosine similarity as computed using a dot product of two vectors; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm: $l=\sqrt{\Sigma_{i=0}^{n} a_i^2}$, where $a_i$ is attribute number i of the vector. Scaling and/or normalization may function to make vector comparison independent of absolute quantities of attributes, while preserving any dependency on similarity of attributes.

In an embodiment, and still referring to FIG. 2, computing device 112 may determine malicious quantifier 204 as a function of identifying a malicious component embedded in package build 104 and/or package manifest 108. As used in this disclosure a "malicious component" is a library and/or package that comprises a malicious act and/or malicious intent. In a non-limiting embodiment, computing device 112 may determine malicious quantifier 204 as a function of installed package 156 and/or source manifest 160. For example and without limitation, computing device 112 may recognize malicious quantifier 204 and/or any suspicious quantifier that may be denoted or warned by some data stored in package historical database 148. For example, malicious component may include one or more libraries and/or packages that are placed by typo squatters that have similar names to authentic software. In an embodiment, typo squatters may rely on several techniques to take advantage of common typing errors. The following examples illustrate common typo squatter techniques for a hypothetical package name, "sckit-learn 1.03", replacing special characters "sckit learn 1.03", removing special characters "scikitlearn 1.03", typing mistake "scikt-learn 1.03" string order "learn-sckit 1.03", character order "scikit-laern 1.03", looking for spelling mistakes "scikit-lern 1.03", creating a new version that is not legitimate "scikit-learn 1.031", hoping for an autocorrect or autocomplete replacement: "sciencekit-learn 1.03", and the like thereof. In another embodiment, malicious component may include a package or library which may include intentional vulnerabilities, backdoors, remote code execution, hidden code, viruses, malware, spyware, data harvesting, intentional error generation, or other malicious actions. In an embodiment, and without limitation, malicious component may be hard to detect after inclusion because they may perform the functions of the originally intended package or library exactly as expected, with the addition of a hidden malicious action that is undetectable until activated.

Still referring to FIG. 2, computing device 112 determines malicious quantifier 204 as a function of software component metadata and source repository metadata using a malicious machine-learning model. As used in this disclosure an "malicious machine-learning model" is a machine-learning model to determine malicious quantifier 204 output given package build 104 and/or package build manifest 108 as inputs, wherein a machine-learning model incorporates a machine-learning process, and wherein "machine-learning process," as used herein, is a process that automatedly uses a body of data known as "training data" and/or a "training set" to generate an algorithm that will be performed by a computing device/module to produce outputs given data provided as inputs; this is in contrast to a non-machine learning software program where the commands to be executed are determined in advance by a user and written in a programming language. The malicious machine-learning model may include one or more malicious machine-learning processes such as supervised, unsupervised, or reinforcement machine-learning processes that computing device 112 and/or a remote device may or may not use in the determination of malicious quantifier 204. As used in this disclosure "remote device" is an external device to computing device 112.

Still referring to FIG. 2, computing device 112 may train malicious machine-learning process as a function of a malicious training set. As used in this disclosure a "malicious training set" is a training set that correlates a metadata difference to a malicious identifier. As used in this disclosure a "metadata difference" is measurable value representing a difference and/or discrepancy associated with a package build metadata and/or a metadata from package historical database 148. For example, and without limitation, metadata difference may be 20 for a difference exists as a function of a component name comprising "ABC_" and a source repository metadata naming convention of "abc_." As used in this disclosure a "malicious identifier" is a measurable value representing the presence malicious schemas. In an embodiment, and without limitation, malicious identifier may denote the presence of cybersquatting, hijacking, typo squatting, and the like thereof. The malicious training set may be received as a function of user-entered valuations of metadata differences and/or malicious identifiers. Computing device 112 may receive malicious training set by receiving correlations of metadata differences and/or malicious identifiers that were previously received and/or identified during a previous iteration of determining malicious quantifier. The malicious training set may be received by one or more remote devices that at least correlate a metadata difference to a malicious identifier. The malicious training set may be received in the form of one or more user-entered correlations of a metadata difference to a malicious identifier.

Still referring to FIG. 2, computing device 112 may be configured to generate an alert datum 212. An "alert datum" as used in this disclosure, is an element of data describing information regarding potentially malicious events of package build 104 and/or package build manifest 108. In a non-limiting embodiment, alert datum 212 may include any signal, bit, and/or signal that at least conveys a message to a user relating to malicious quantifier 116. Alert datum 212 may include a plurality of warning signs. In a non-limiting embodiment, alert datum 212 may include a plurality of indicators highlighting a phenomenon of a failure of package build 108 installation, fault, and/or any potentially malicious event. In a non-limiting embodiment, alert datum 212 may include a plurality of safety measures, safety instructions, maintenance information, and the like thereof. In a non-limiting embodiment, alert datum 212 may include a boolean determination. For example and without limitation, alert datum 212 may include an "X" for each dependent software program of package build 104 that results in a malicious event, contains malicious quantifier 204, and the like thereof. Persons skilled in the art, upon reviewing the entirety of this disclosure, will be aware of the various indicators of a conditional representing the comparison in the form of an alert datum consistent with this disclosure.

Still referring to FIG. 2, computing device 112 may transmits alert datum 212 as a function of malicious quantifier 116 and a malicious threshold 208. As used in this disclosure a "malicious threshold" is a limit and/or threshold that denotes high likelihood of a malicious software and/or malicious component is embedded in the software component. In an embodiment, and without limitation, malicious threshold 208 may denote that any malicious quantifier and/or value that is less than the threshold may indicate that software component 108 and/or NAT is not to be flagged as problematic for inclusion. In another embodiment, and without limitation, predictive threshold may denote that any malicious quantifier and/or value that exceeds and/or is greater than the threshold value may indicate a potential typo squatting, cybersquatting, or hijacking. In an embodiment, and without limitation, predictive threshold may denote a threshold for a string matching for a corporate match string to be investigated.

Figure 3:
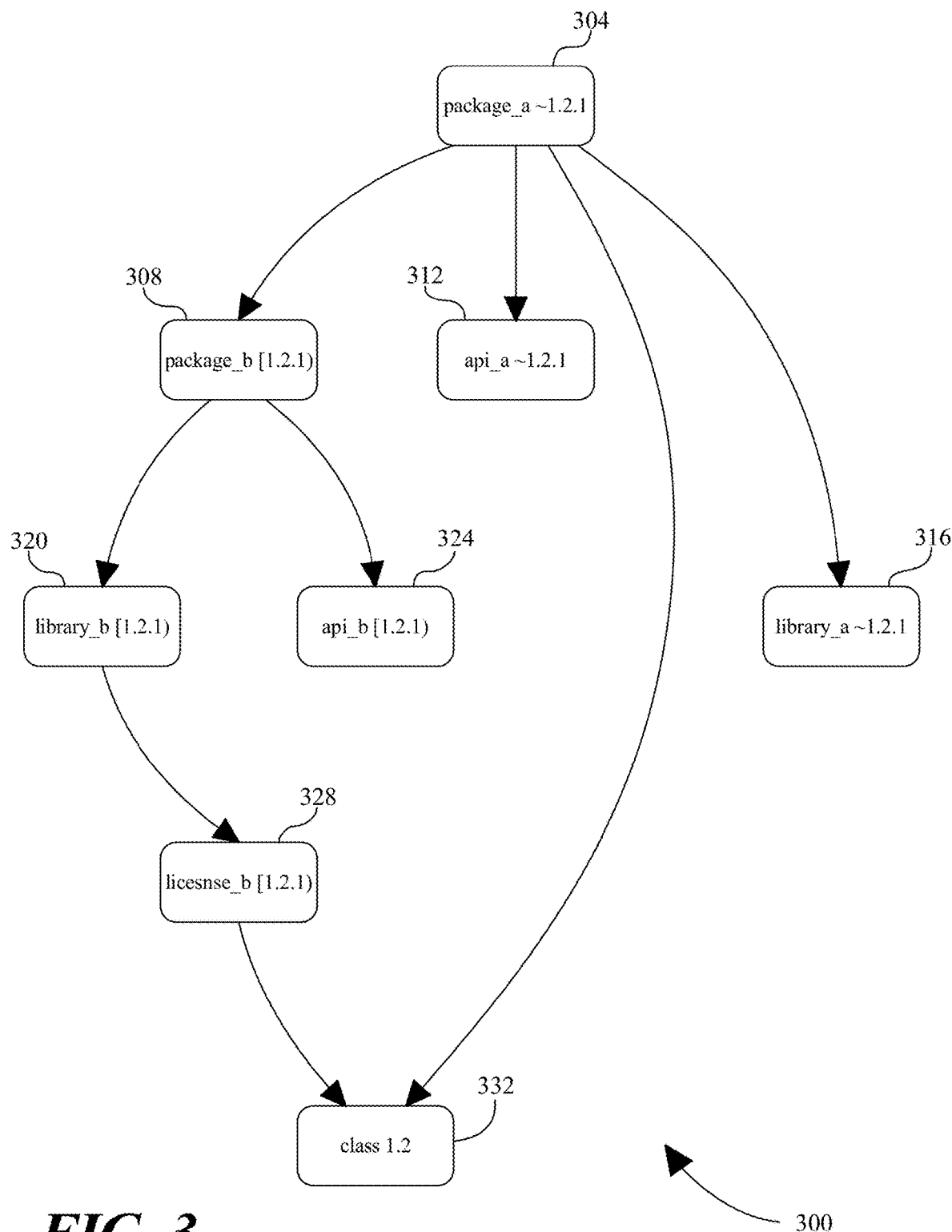
FIG. 3 is a diagrammatic representation of a manifest dependency tree according to an embodiment of the invention.

Referring now to FIG. 3, a diagrammatic representation of a manifest dependency tree 300 is illustrated. Manifest dependency tree 300 includes a root 304. In a non-limiting embodiment, root node 304 may include a package build's name and version number. Root 304 may have a plurality of children. Each children may denote a dependent software component as described in the entirety of this disclosure. Node 308 may include another package that the package of root 304 depends on. Node 308 may include its own name and version. In a non-limiting embodiment, root 304 may have a leaf 312. Leaf 312 may include some API that includes some declaration that the package of root 304 depends on. In some embodiments, an API of leaf 312 may not depend on previous APIs, builds, etc. In another non-limiting embodiment, the package of root 304 may also depend on leaf 316. Leaf 316 may include some library that the package of root 304 depends on. Persons skilled in the art, upon reviewing the entirety of this disclosure, will be aware of the various software components that a package depends on in the context of dependency.

Still referring to FIG. 3, node 308 may also have children nodes. The package of node 308 that the package of root 304 depends on may also include its own dependent software components. In a non-limiting embodiment, the package of root 308 may depend on an API of node 3124. In another non-limiting embodiment, the package of root 308 may depend on a library denoted by node 320, wherein that library also depends on some other software components. In a non-limiting embodiment, the library denoted by node 320 may depend on some security component such as a license denoted by node 328. In another non-limiting embodiment, the license denoted by node 328 may further depend on software component such as a class denoted by node 332. In some embodiments, the class denoted by node 332 may also be a dependent software component of the package of root 304. Persons skilled in the art, upon reviewing the entirety of this disclosure, will be aware of the various embodiments of dependencies within a software package for purposes as described herein.

Figure 4:
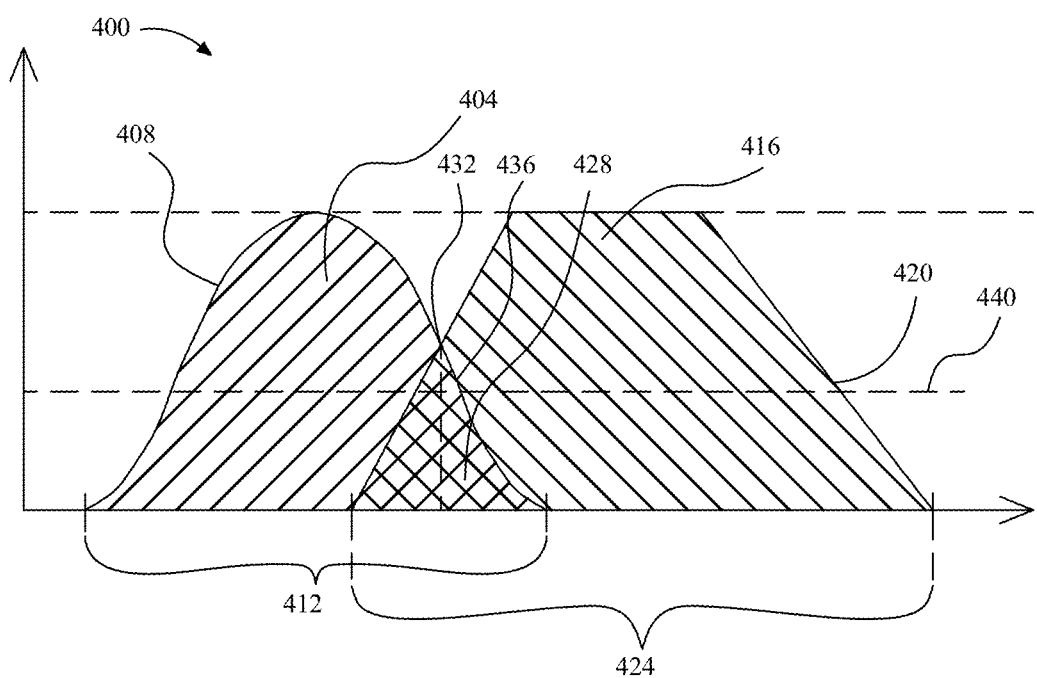
FIG. 4 is a block diagram illustrating exemplary embodiments of fuzzy sets.

Now referring to FIG. 4, an exemplary embodiment of fuzzy set comparison 400 is illustrated. In a non-limiting embodiment, fuzzy set comparison 400 may be consistent with comparison 180 in FIG. 1. In another non-limiting the fuzzy set comparison 400 may be consistent with the name/version matching as described herein. For example and without limitation, the parameters, weights, and/or coefficients of the membership functions may be tuned using any machine-learning methods for the name/version matching as described herein. In another non-limiting embodiment, the fuzzy set may represent compatibility threshold 176 and its ranges from FIG. 1.

Alternatively or additionally, and still referring to FIG. 4, fuzzy set comparison 400 may be generated as a function of determining data compatibility threshold and/or version authenticator. The version authenticator can include one or more ranges of version numbers. The compatibility threshold and/or version authenticator may be determined by a computing device. In some embodiments, a computing device may use a logic comparison program, such as, but not limited to, a fuzzy logic model to determine the compatibility threshold and/or version authenticator. Each such compatibility threshold and/or version authenticator may be represented as a value for a linguistic variable representing the compatibility threshold and/or version authenticator, or in other words a fuzzy set as described above that corresponds to a degree of compatibility and/or allowability as calculated using any statistical, machine-learning, or other method that may occur to a person skilled in the art upon reviewing the entirety of this disclosure. In some embodiments, determining the compatibility threshold and/or version authenticator may include using a linear regression model. A linear regression model may include a machine learning model. A linear regression model may map statistics such as, but not limited to, frequency of the same range of version numbers, and the like, to the compatibility threshold and/or version authenticator. In some embodiments, determining the compatibility threshold and/or version authenticator of any manifest may include using a classification model. A classification model may be configured to input collected data and cluster data to a centroid based on, but not limited to, frequency of appearance of the range of versioning numbers, linguistic indicators of compatibility and/or allowability, and the like. Centroids may include scores assigned to them such that the compatibility threshold and/or version authenticator may each be assigned a score. In some embodiments, a classification model may include a K-means clustering model. In some embodiments, a classification model may include a particle swarm optimization model. In some embodiments, determining a compatibility threshold and/or version authenticator may include using a fuzzy inference engine. A fuzzy inference engine may be configured to map one or more compatibility threshold and/or version authenticator elements using fuzzy logic. In some embodiments, a plurality of computing devices may be arranged by a logic comparison program into compatibility arrangements. A "compatibility arrangement" as used in this disclosure is any grouping of objects and/or data based on skill level and/or output score. Membership function coefficients and/or constants as described above may be tuned according to classification and/or clustering algorithms. For instance, and without limitation, a clustering algorithm may determine a Gaussian or other distribution of questions about a centroid corresponding to a given compatibility threshold and/or version authenticator, and an iterative or other method may be used to find a membership function, for any membership function type as described above, that minimizes an average error from the statistically determined distribution, such that, for instance, a triangular or Gaussian membership function about a centroid representing a center of the distribution that most closely matches the distribution. Error functions to be minimized, and/or methods of minimization, may be performed without limitation according to any error function and/or error function minimization process and/or method as described in this disclosure.

Still referring to FIG. 4, inference engine may be implemented according to input and/or output membership functions and/or linguistic variables. For instance, a first linguistic variable may represent a first measurable value pertaining to a versioning descriptor (e.g. "*", "A", "~", etc.), such as whether the versioning descriptor indicates a major version update, minor version update, patch version update, and the like thereof, while a second membership function may indicate a degree of incrementable versions based on the version number and/or versioning descriptor, or another measurable value pertaining to the versioning descriptor. Continuing the example, an output linguistic variable may represent, without limitation, a score value and/or version number. An inference engine may combine rules, such as any semantic versioning, semantic language, version ranges, and the like thereof. An inference engine may further combine rules that indicate how many incremental versions there are based on the versioning descriptor for major update, minor update, and/or patch update—the degree to which a given input function membership matches a given rule may be determined by a triangular norm or "T-norm" of the rule or output membership function with the input membership function, such as min (a, b), product of a and b, drastic product of a and b, Hamacher product of a and b, or the like, satisfying the rules of commutativity (T(a, b)=T(b, a)), monotonicity: (T(a, b)≤T(c, d) if a≤c and b≤d), (associativity: T(a, T(b, c))=T(T(a, b), c)), and the requirement that the number 1 acts as an identity element. Combinations of rules ("and" or "or" combination of rule membership determinations) may be performed using any T-conorm, as represented by an inverted T symbol or "⊥" such as max(a, b), probabilistic sum of a and b (a+b−a*b), bounded sum, and/or drastic T-conorm; any T-conorm may be used that satisfies the properties of commutativity: ⊥(a, b)=⊥(b, a), monotonicity: ⊥(a, b)≤⊥(c, d) if a≤c and b≤d, associativity: ⊥(a, ⊥(b, c))=⊥(⊥(a, b), c), and identity element of 0. Alternatively or additionally T-conorm may be approximated by sum, as in a "product-sum" inference engine in which T-norm is product and T-conorm is sum. A final output score or other fuzzy inference output may be determined from an output membership function as described above using any suitable defuzzification process, including without limitation Mean of Max defuzzification, Centroid of Area/Center of Gravity defuzzification, Center Average defuzzification, Bisector of Area defuzzification, or the like. Alternatively or additionally, output rules may be replaced with functions according to the Takagi-Sugeno-King (TSK) fuzzy model.

A first fuzzy set 404 may be represented, without limitation, according to a first membership function 408 representing a probability that an input falling on a first range of values 412 is a member of the first fuzzy set 404, where the first membership function 408 has values on a range of probabilities such as without limitation the interval [0,1], and an area beneath the first membership function 408 may represent a set of values within first fuzzy set 404. Although first range of values 412 is illustrated for clarity in this exemplary depiction as a range on a single number line or axis, first range of values 412 may be defined on two or more dimensions, representing, for instance, a Cartesian product between a plurality of ranges, curves, axes, spaces, dimensions, or the like. First membership function 408 may include any suitable function mapping first range 412 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, \text{ for } x > c \text{ and } x < a \\ \frac{x-a}{b-a}, \text{ for } a \leq x < b \\ \frac{c-x}{c-b}, \text{ if } b < x \leq c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}(\frac{x-c}{\sigma})^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

First fuzzy set 404 may represent any value or combination of values as described above, including any software component datum, any source repository datum, any malicious quantifier datum, any predictive threshold datum, any string distance datum, any resource datum, any niche datum, and/or any combination of the above. A second fuzzy set 416, which may represent any value which may be represented by first fuzzy set 404, may be defined by a second membership function 420 on a second range 424; second range 424 may be identical and/or overlap with first range 412 and/or may be combined with first range via Cartesian product or the like to generate a mapping permitting evaluation overlap of first fuzzy set 404 and second fuzzy set 416. Where first fuzzy set 404 and second fuzzy set 416 have a region 428 that overlaps, first membership function 408 and second membership function 420 may intersect at a point 432 representing a probability, as defined on probability interval, of a match between first fuzzy set 404 and second fuzzy set 416. Alternatively or additionally, a single value of first and/or second fuzzy set may be located at a locus 436 on first range 412 and/or second range 424, where a probability of membership may be taken by evaluation of first membership function 408 and/or second membership function 420 at that range point. A probability at 428 and/or 432 may be compared to a threshold 440 to determine whether a positive match is indicated. Threshold 440 may, in a non-limiting example, represent a degree of match between first fuzzy set 404 and second fuzzy set 416, and/or single values therein with each other or with either set, which is sufficient for purposes of the matching process; for instance, compatibility threshold 176 and/or version authenticator 168 may indicate a sufficient degree of overlap universal version element 152, source version element 164, and/or string distances for combination to occur as described above. There may be multiple thresholds; for instance, a second threshold may indicate a sufficient match for purposes of compatibility threshold 176 and/or version authenticator 168 as described in this disclosure. Each threshold may be established by one or more user inputs. Alternatively or additionally, each threshold may be tuned by a machine-learning and/or statistical process, for instance and without limitation as described in further detail below.

In an embodiment, a degree of match between fuzzy sets may be used to rank one resource against another. For instance, if two malicious quantifiers have fuzzy sets matching a malicious component fuzzy set by having a degree of overlap exceeding a predictive threshold, computing device 104 may further rank the two resources by ranking a resource having a higher degree of match more highly than a resource having a lower degree of match. Where multiple fuzzy matches are performed, degrees of match for each respective fuzzy set may be computed and aggregated through, for instance, addition, averaging, or the like, to determine an overall degree of match, which may be used to rank resources; selection between two or more matching resources may be performed by selection of a highest-ranking resource, and/or multiple notifications may be presented to a user in order of ranking.

Figure 5:
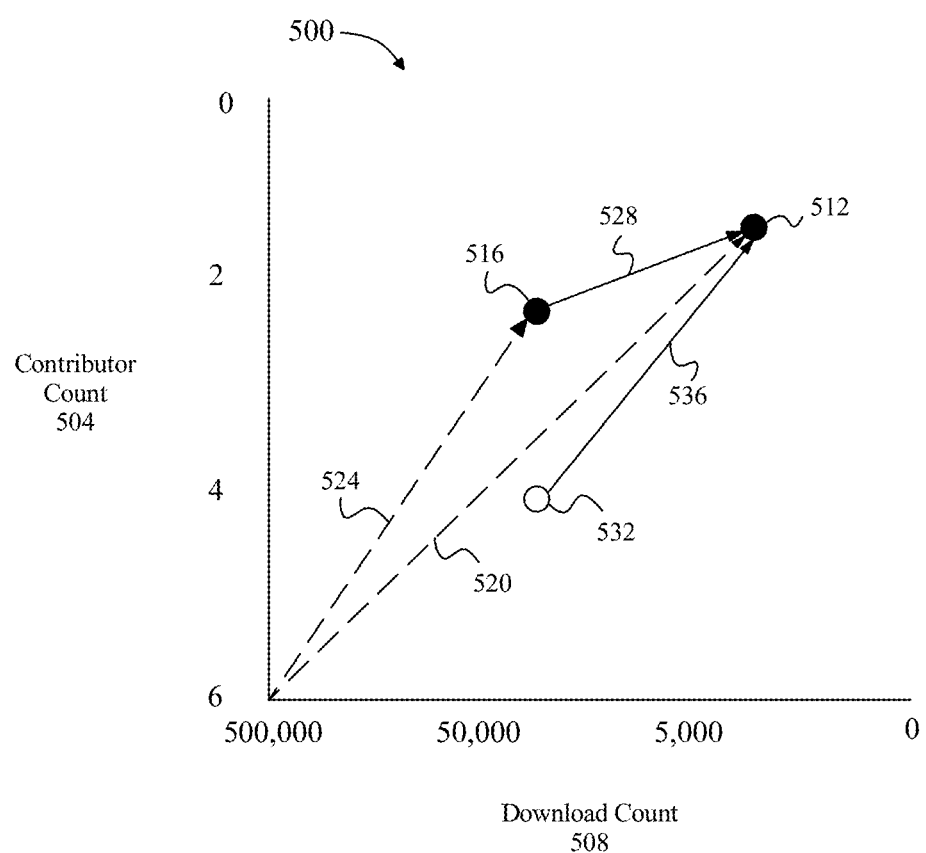
FIG. 5 is a diagrammatic representation of a string distance according to an embodiment of the invention.

Now referring to FIG. 5, an exemplary embodiment 500 of a string distance is illustrated. String distance includes any of the string distance as described above, in reference to FIG. 1. In an embodiment, and without limitation, string distance may include a distance calculation between a plurality of parameters. For example, string distance may be determined as a function of plotting a contributor count 504 on a y-axis and a download count 508 on the x-axis. As used in this disclosure a "contributor count" is a quantitative amount of the number of contributors that have access to a software component such as a package and/or library. In an embodiment, and without limitation, contributor count 504 may be determined as a function of possible matches being evaluated and/or by looking through the entire list of packages rather than just the filtered subset. IN another embodiment, and without limitation, the distribution of values may be relatively compact wherein the largest value may be only a few multiples of the smallest value and with few outliers. In another embodiment, and without limitation, a maximum value of 6 may be observed in the data set. In the illustrated embodiment, and without limitation, higher values may indicate a more active package and more likely to be a good choice, wherein the value 6 may be the optimal origin. As a non-limiting example, a higher number of contributors may be a general indication of a more utilized library which is less likely to be malicious. As used in this disclosure a "download count" is a quantitative value representing the number of downloads of a software component. In an embodiment, and without limitation, download count 508 may be computed by analyzing the metadata values for the entire list of possible matches being evaluated. In an embodiment, and without limitation, a higher number of downloads, may be a general indication of a more utilized library which may be less likely to be malicious. In an embodiment, and without limitation, an algorithm may be used to determine whether a log or linear scale would be preferred and if a log scale, the optimum base value, such that for a distance calculation, the corresponding log values may be used.

While the illustration uses two parameters for illustration purposes, the actual method is capable utilizing any number of dimensions. In an embodiment, and without limitation, string distance may be calculated as a function of a name matching algorithm, wherein name matching algorithm includes any of the name matching algorithm as described in FIG. 1. In another embodiment, and without limitation, name matching algorithm may include a distance algorithm, wherein the distance algorithm is extended to as many dimensions for which metadata parameters are available that may indicate a more suitable package than the one initially specified (the "name as typed") which is less likely to be malicious. In an embodiment, and without limitation, string distance may be determined as a function of combining the distance of two parameters to determine a combined distance for comparing two software components. In the illustrated example, two parameters may be used to compute a distance from a center origin that may indicate a better match for the user's intended included open-source software than the name as typed. While the illustration utilizes cartesian coordinate system it is possible to use other coordinate systems in the distance computation.

Still referring to FIG. 5, a datapoint such as a name as typed open-source package 512 may be plotted on the graph. As used in this disclosure a "name as typed open-source package" is the unique identifier of one or more packages and/or libraries. For example, and without limitation, name as typed open-source package 512 may include prepend strings such as "ABC_", "MM_YY" and the like thereof. In an embodiment, and without limitation, name as typed open-source package 512 may include one or more letters, numbers, symbols, special characters, logos, and the like thereof. In another embodiment, and without limitation, name as typed open-source package 512 may include one or more languages such as but not limited to English, Japanese, Spanish, German, Russian, French, Mandarin, Arabic, Hindi, Portuguese, Bengali, Lahnda, and the like thereof. In an embodiment, and without limitation name as typed open-source package 512 may comprise a name as typed distance 520 from the origin of the graph. As used in this disclosure a "distance" is a quantitative measurement denoting a length and/or space between two things, points, lines, and the like thereof. For example, name as typed distance 520 may denote that a name as typed open-source package is 1.2 cm from the origin of the plot.

In another embodiment, and still referring to FIG. 5, a datapoint such as an alternate open-source package 516 may be plotted on the graph. As used in this disclosure an "alternate open-source package" is a unique identifier of one or more alternate and/or distinct packages and/or libraries from name as typed open-source package. For example, and without limitation, alternate open-source package 516 may include prepend strings such as "ABC_", "MM_YY" and the like thereof. In an embodiment, and without limitation, alternate open-source package 516 may include one or more letters, numbers, symbols, special characters, logos, and the like thereof. In another embodiment, and without limitation, alternate open-source package 516 may include one or more languages such as but not limited to English, Japanese, Spanish, German, Russian, French, Mandarin, Arabic, Hindi, Portuguese, Bengali, Lahnda, and the like thereof. In an embodiment, and without limitation alternate open-source package 516 may comprise an alternate distance 524 from the origin of the graph. For example, alternate distance 524 may denote that alternate open-source package 516 is 5.8 cm from the origin of the plot. In another embodiment, and without limitation, a difference distance 528 may represent an unweighted distance between name as typed open-source package 512 and alternate open-source package 516. For example, and without limitation, difference distance 528 may allow computing device to evaluate and/or determine one or more similarities between name as typed open-source package 512 and alternate open-source package 516.

In an embodiment, and still referring to FIG. 5, parameter values may be oriented to align maximum or "good" values at an origin point. For both of the illustrated parameters, contributor count and/or download count, a higher number indicates a higher likelihood the package is not malicious. Thus, the origin or intersection point of the two arrays of values for the two parameters are oriented such that both arrays decrease in value as they extend away from the origin. In an embodiment, and without limitation, the orienting step or the step of defining the array can be done across all software repositories and their corresponding open-source packages and libraries. In another embodiment, and without limitation, one or more repositories are grouped as subsets and analyzed separately, which can be more computationally efficient and improve the resolution of the calculations. In another embodiment, and without limitation, subsets can be aggregated in advance based on package and library metadata, such as by the programming language, the number of downloads or other metadata. In the illustrated example, for each metadata parameter, a reasonable scale and orientation for the axis is determined to compute the distance.

In another embodiment, and still referring to FIG. 5, datapoints may be weighted such that a weighted value 532 may be determined. As used in this disclosure a "weighted value" is a quantitative value that has been modified as a function of contribution element, wherein a contribution element denotes the relative amount of importance for a contributor count and/or a download count. For example, and without limitation, weighted value 532 may indicate a weighted value being applied to the distance between the Open-Source Package and the Name as Typed for the Contributor Count. As a further non-limiting example, weighted value 532 may be 3, wherein a value of 3 may indicate that the "number of contributors" should be given three times the weight when computing the distance, wherein the length of vertical component may be altered such that the computed distance may be 3 times as long. In an embodiment, and without limitation, if a weight were less than 1, it may indicate a smaller contribution to the distance. In another embodiment, and without limitation, a weight of 0 may indicate that this metadata parameter, for this subset of packages and/or libraries, may be ignored. Weights may be negative values, and behave similarly, when the axis orientation may indicate better values are further from point of origin. Additionally or alternatively, weights may be set for different open-source subsets. For example and without limitation, a language comprising a small number of contributors in most open-source packages may benefit from a little weight being given to the contributor count. Similarly, a language where the most popular libraries have large number of downloads may benefit by weighting the number of downloads higher. The weights may be determined with a separate analysis ahead of time or by an automated algorithm that compares known malicious libraries with their known targets. Additionally or alternatively, a weighted distance 536 may be determined as a function of weighted value 532. As used in this disclosure a "weighted distance" is a distance that extends from the weighted value to the name as typed open-source package value. In an embodiment, weighted distance 536 may be used to compare against predictive threshold to indicate whether the open-source package/library is potentially what the user wanted when compared with the "Name as Typed" package. In an embodiment, and without limitation, more credence may be given with a weight to the contributor count made the distance larger and more likely to go over the predictive threshold for presentation to the user.

In one example, the steps of aggregating subsets and orienting the arrays of parameter values to an origin for a composite distance calculation involves analyzing a data distribution for each metadata parameter and grouping and orienting similar data sets in a consistent fashion for evaluation. For example, if a data set has very large and very small samples, a logarithmic scale may be applied, and a logarithmic value of the parameter used for the distance calculation. If a data set is linear with an even distribution, the actual numbers may be used. In yet other examples, a binning or bucketization, wherein the bucketization may be consistent with the bucketization of FIG. 3. in U.S. patent application Ser. No. 17/460,611. Orientation and scale allow the computed distance to have appropriate contributions from each parameter when indicating an open-source package is more likely to be what the user was looking for when compared to the "name as typed."

Figure 6:
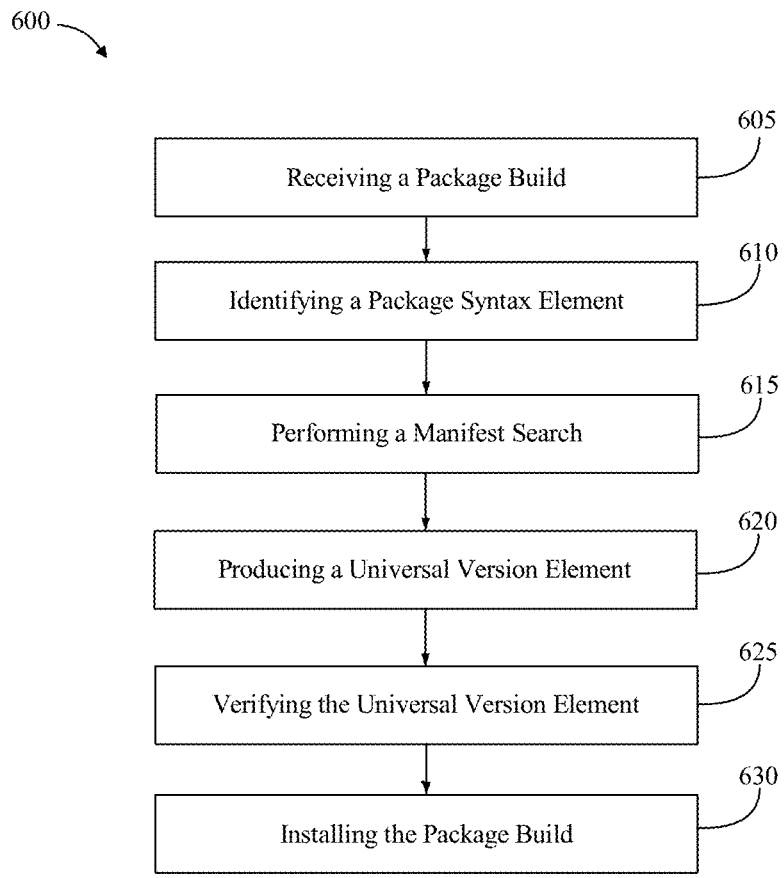
FIG. 6 is a flow diagram of an exemplary embodiment of a method for version control in a computing device.

Now referring to FIG. 6, a flow diagram of an exemplary embodiment of a method 600 for version control in a computing device is presented. At step 605, computing device may receive a package build, wherein the package build comprises a package build manifest. Package build may be consistent with any package build as described herein. The package build manifest may be consistent with any package build manifest as described herein.

Still referring to FIG. 6, at step 610, computing device may identify a package syntax element from the package build. Package syntax element may be consistent with any package syntax element as described herein. In a non-limiting embodiment, package syntax element may be generated as a function of a syntax element machine-learning model. Syntax element machine-learning may include any syntax element machine-learning as described herein. In a non-limiting embodiment, method 600 may include receiving package build and/or package build manifest as an input and outputting the package syntax element using a syntax element training set. Syntax element training set may include any syntax element training set as described herein. In a non-limiting embodiment, method 600 may include retrieving syntax element training set from a package historical database. Package historical database may be consistent with any package historical database as described herein. method 600, at step 610, may include identifying a semantic language of the package build. Semantic language may include any semantic language as described herein. Method 600, at step 610, may also include identifying a versioning descriptor. Versioning descriptor may include any versioning descriptor as described herein.

Still referring to FIG. 6, at step 615, computing device may perform a manifest search as a function of the package syntax element. Manifest search may be consistent with any manifest search as described herein. In a non-limiting embodiment, method 600 may include reading and/or generating a manifest dependency tree of package build 104. Manifest dependency tree may be consistent with any manifest dependency tree as described herein. In a non-limiting embodiment, method 600 may include performing a tree traversal of the manifest dependency tree. Tree traversal may include any tree traversal as described herein.

Still referring to FIG. 6, at step 620, computing device may produce a universal version element as a function of the manifest search. Universal version element may be consistent with any universal version element as described herein. Universal version element may be produced as s function of the tree traversal. In another non-limiting embodiment, method 600 may include generating, by computing device, a universal version machine-learning model, training the universal version machine-learning model using a version training set, wherein the version training set comprises sequence of version numbers correlated to an element of a universal version element, and outputting the universal version element as a function of the universal version machine-learning model using the package syntax element as an input. Universal version machine-learning model may include any universal version machine-learning model as described herein. Version training set may include any version training set as described herein.

Still referring to FIG. 6, computing device may verify universal version element as a function of a version authenticator. Version authenticator may include any version authenticator as described herein. In a non-limiting embodiment, method 600 may include any variation as described herein. Method 600 may include comparing the universal version element and a source version element of a version descriptor of an installed package. Source version element may include a universal version element of an installed package. In a non-limiting embodiment, version authenticator may include at least a compatible versions for installed package 156 and/or package build 104 retrieved from a version installer database. Version installer database may include any version installer database as described herein.

Still referring to FIG. 6, at step 630, computing device may install package build as a function of the verification. Installation may include any installation as described herein. In a non-limiting embodiment, installation may include using any installer associated with package build, wherein the installer is retrieved from the version installer database. In some embodiments, computing device may not install package build; for instance, and without limitation, computing device may proceed to one or more additional processes and/or steps instead of and/or in addition to installation, such as any processes and/or steps to search for vulnerabilities, typos, and/or malicious elements in package build a dependency tree thereof, or the like, for instance as described in references incorporated by reference herein, and/or display of such vulnerabilities, typos, and/or malicious elements to a user in a user interface.

Figure 7:
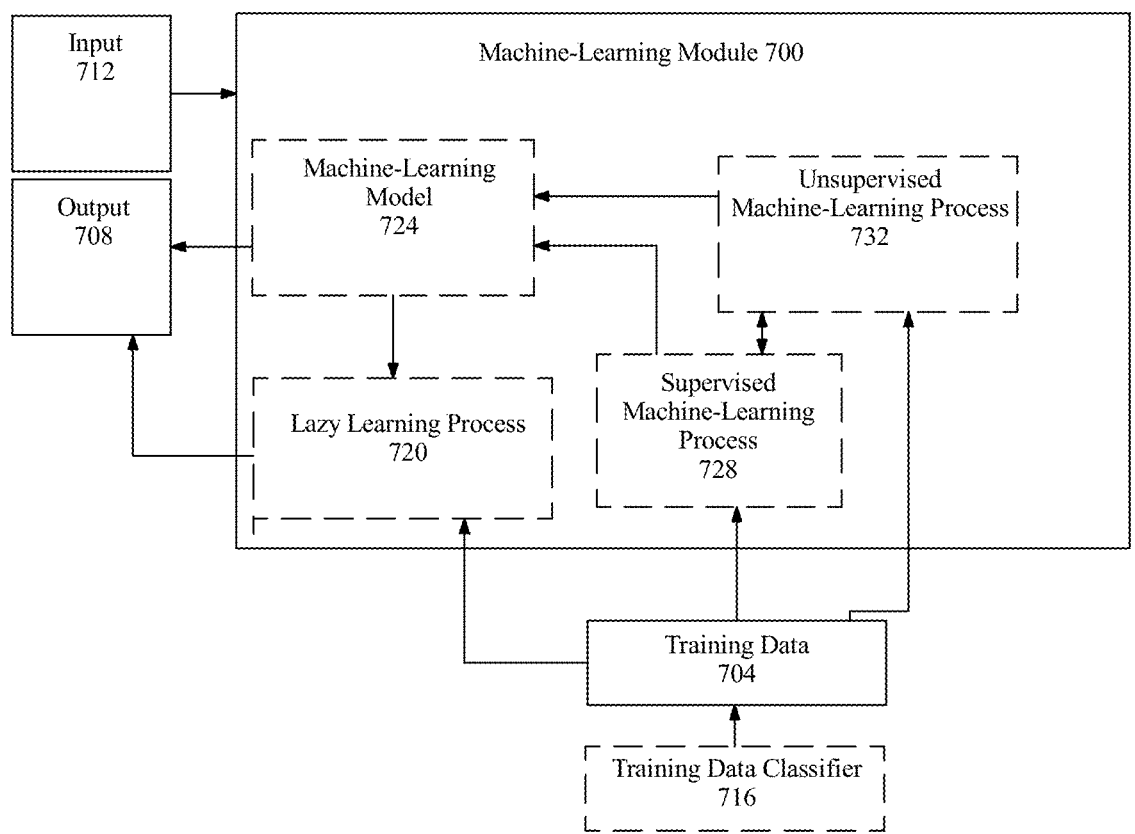
FIG. 7 is a block diagram illustrating an exemplary embodiment of a machine-learning module.

Referring now to FIG. 7, an exemplary embodiment of a machine-learning module 700 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 704 to generate an algorithm that will be performed by a computing device/module to produce outputs 708 given data provided as inputs 712; this is in contrast to a non-machine learning software program where the commands to be executed are determined in advance by a user and written in a programming language.

Still referring to FIG. 7, "training data," as used herein, is data containing correlations that a machine-learning process may use to model relationships between two or more categories of data elements. For instance, and without limitation, training data 704 may include a plurality of data entries, each entry representing a set of data elements that were recorded, received, and/or generated together; data elements may be correlated by shared existence in a given data entry, by proximity in a given data entry, or the like. Multiple data entries in training data 704 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 704 according to various correlations; correlations may indicate causative and/or predictive links between categories of data elements, which may be modeled as relationships such as mathematical relationships by machine-learning processes as described in further detail below. Training data 704 may be formatted and/or organized by categories of data elements, for instance by associating data elements with one or more descriptors corresponding to categories of data elements. As a non-limiting example, training data 704 may include data entered in standardized forms by persons or processes, such that entry of a given data element in a given field in a form may be mapped to one or more descriptors of categories. Elements in training data 704 may be linked to descriptors of categories by tags, tokens, or other data elements; for instance, and without limitation, training data 704 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 7, training data 704 may include one or more elements that are not categorized; that is, training data 704 may not be formatted or contain descriptors for some elements of data. Machine-learning algorithms and/or other processes may sort training data 704 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 704 to be made applicable for two or more distinct machine-learning algorithms as described in further detail below. Training data 704 used by machine-learning module 700 may correlate any input data as described in this disclosure to any output data as described in this disclosure. As a non-limiting illustrative example the inputs and outputs may include any inputs and outputs as described in the entirety of this disclosure.

Further referring to FIG. 7, training data may be filtered, sorted, and/or selected using one or more supervised and/or unsupervised machine-learning processes and/or models as described in further detail below; such models may include without limitation a training data classifier 716. Training data classifier 716 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 700 may generate a classifier using a classification algorithm, defined as a processes whereby a computing device and/or any module and/or component operating thereon derives a classifier from training data 704. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 716 may classify elements of training data to an allowable version element, a range of allowable elements as denoted by the universal version element for which a subset of training data may be selected.

Still referring to FIG. 7, machine-learning module 700 may be configured to perform a lazy-learning process 720 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 704. Heuristic may include selecting some number of highest-ranking associations and/or training data 704 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 7, machine-learning processes as described in this disclosure may be used to generate machine-learning models 724. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 724 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 724 may be generated by creating an artificial neural network, such as a convolutional neural network comprising an input layer of nodes, one or more intermediate layers, and an output layer of nodes. Connections between nodes may be created via the process of "training" the network, in which elements from a training data 704 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 7, machine-learning algorithms may include at least a supervised machine-learning process 728. At least a supervised machine-learning process 728, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include inputs as described in this disclosure as inputs, outputs as described in this disclosure as output, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 704. Persons skilled in the art, upon reviewing the entirety of this disclosure, will be aware of various possible variations of at least a supervised machine-learning process 728 that may be used to determine relation between inputs and outputs. Supervised machine-learning processes may include classification algorithms as defined above.

Further referring to FIG. 7, machine learning processes may include at least an unsupervised machine-learning processes 732. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 7, machine-learning module 700 may be designed and configured to create a machine-learning model 724 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 7, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
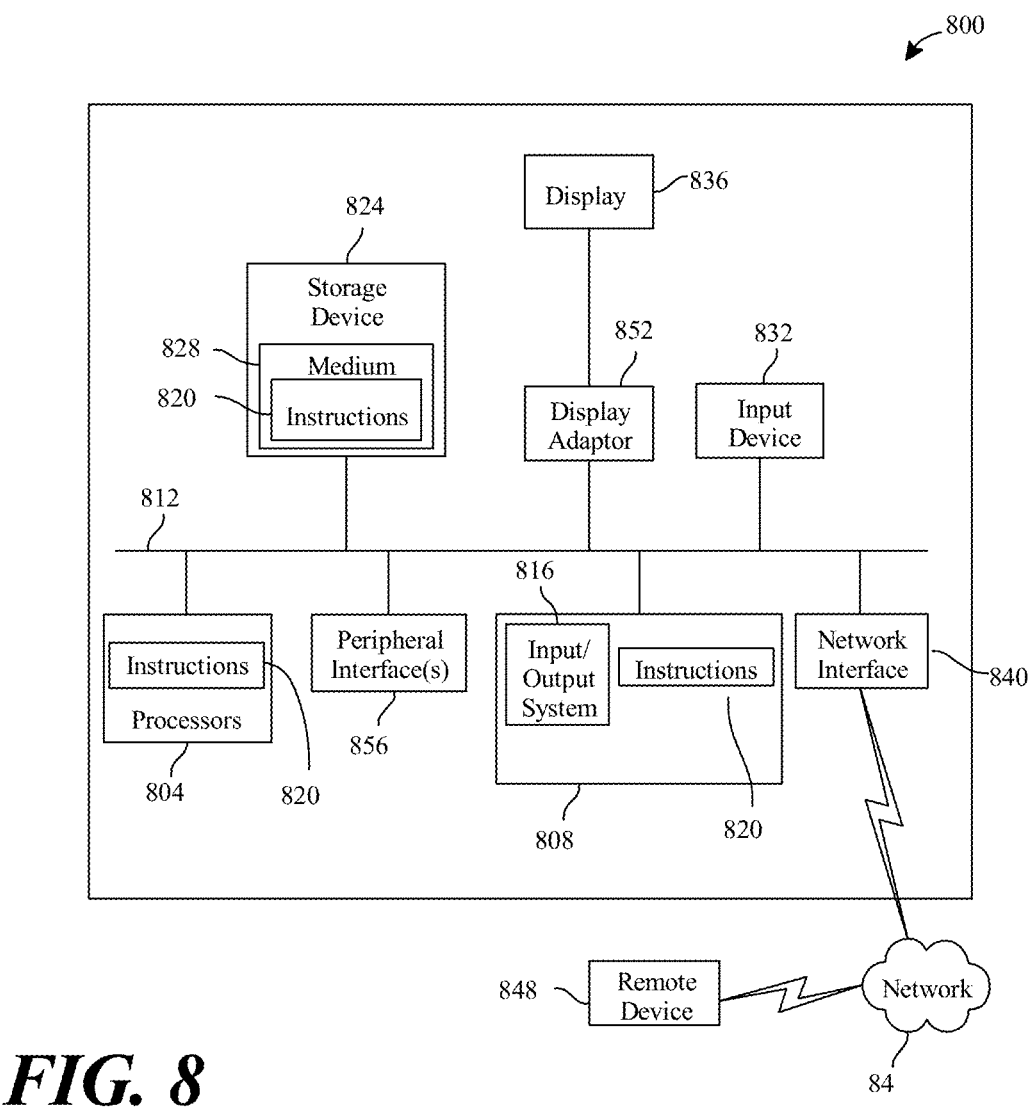
FIG. 8 is a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIREWIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for version control, the system comprising a computing device, wherein the computing device is configured to:
    receive a package build, wherein the package build comprises a package build manifest;
    determine a malicious quantifier measuring presence of malicious software in the package build utilizing a malicious machine-learning model, wherein the malicious machine-learning model is trained by a malicious training set correlating a metadata difference to a malicious identifier;
    identify a package syntax element from the package build;
    perform a manifest search as a function of the package syntax element;
    produce a universal version element as a function of the manifest search;
    verify the universal version element as a function of a version authenticator; and
    install the package build as a function of the verification.
2. The system of claim 1, wherein the computing device is further configured to identify the package syntax element by:

generating a syntax element machine-learning model;
training the syntax element machine-learning model using a syntax element training set, wherein the syntax element training set comprises a plurality of string descriptors correlated to a plurality of semantic identifiers;
outputting the package syntax element as a function of the syntax element machine-learning model and the package build as an input.

3. The system of claim 2, wherein the computing device is further configured to retrieve the syntax element training set from a package historical database.

4. The system of claim 1, wherein the package syntax element further comprises a semantic language associated with the package build.

5. The system of claim 1, wherein the package syntax element further comprises a versioning descriptor.

6. The system of claim 1, wherein performing the manifest search further comprises:
generating, by the computing device, a universal version machine-learning model;
training the universal version machine-learning model using a version training set, wherein the version training set comprises a plurality of sequences of version numbers correlated to a plurality of universal version elements; and
outputting the universal version element as a function of the universal version machine-learning model using the package syntax element as an input.

7. The system of claim 1, wherein the manifest search further comprises a tree traversal.

8. The system of claim 1, wherein the version authenticator comprises at least a compatible version retrieved from a version installer database.

9. The system of claim 1, wherein the verification of the universal version element further comprises a comparison of the universal version element and a source version element of an installed package.

10. The system of claim 9, wherein the comparison further comprises comparing as a function of a compatibility threshold.

11. A method for version control, the method comprising:
receiving, by a computing device, a package build, wherein the package build comprises a package build manifest;
determining, by the computing device, a malicious quantifier measuring presence of malicious software in the package build utilizing a malicious machine-learning model, wherein the malicious machine-learning model is trained by a malicious training set correlating a metadata difference to a malicious identifier;
identifying, by the computing device, a package syntax element from the package build;
performing, by the computing device, a manifest search as a function of the package syntax element;
producing, by the computing device, a universal version element as a function of the manifest search;
verifying, by the computing device, the universal version element as a function of a version authenticator; and
installing, by the computing device, the package build as a function of the verification.

12. The method of claim 11, wherein the identifying the package build further comprises:
generating, by the computing device, a syntax element machine-learning model;
training the syntax element machine-learning model using a syntax element training set, wherein the syntax element training set comprises a plurality of string descriptor correlated to a plurality of semantic identifiers;
outputting the package syntax element as a function of the syntax element machine-learning model and the package build as an input.

13. The method of claim 12, wherein the method further comprises retrieving the syntax element training set from a package historical database.

14. The method of claim 11, wherein the package syntax element further comprises a semantic language associated with the package build.

15. The method of claim 11, wherein the package syntax element further comprises at least a versioning descriptor.

16. The method of claim 11, wherein performing the manifest search further comprises:
generating, by the computing device, a universal version machine-learning model;
training the universal version machine-learning model using a version training set, wherein the version training set comprises a plurality of sequences of version numbers correlated to a plurality of universal version elements; and
outputting the universal version element as a function of the universal version machine-learning model using the package syntax element as an input.

17. The method of claim 11, wherein performing the manifest search further comprises performing a tree traversal configured to produce the universal version element.

18. The method of claim 11, wherein the version authenticator comprises at least a compatible version retrieved from a version installer database.

19. The method of claim 11, wherein verifying the universal version element further comprises comparing the universal version element and a source version element of a version descriptor of an installed package.

20. The method of claim 19, wherein the comparison further comprises comparing as a function of a compatibility threshold.

* * * * *